(12) United States Patent
Voth

(10) Patent No.: US 8,253,725 B2
(45) Date of Patent: Aug. 28, 2012

(54) METHOD AND SYSTEM FOR GENERATING SURFACE MODELS OF GEOMETRIC STRUCTURES

(75) Inventor: Eric J. Voth, Maplewood, MN (US)

(73) Assignee: St. Jude Medical, Atrial Fibrillation Division, Inc., St. Paul, MN (US)

( * ) Notice: Subject to any disclaimer, the term of this patent is extended or adjusted under 35 U.S.C. 154(b) by 1020 days.

(21) Appl. No.: 11/966,097

(22) Filed: Dec. 28, 2007

(65) Prior Publication Data

US 2009/0167755 A1 Jul. 2, 2009

(51) Int. Cl.
G06T 15/00 (2011.01)
(52) U.S. Cl. ........ 345/419; 345/420; 345/441; 345/619; 382/128; 382/173; 600/410
(58) Field of Classification Search .................. 345/419, 345/420, 441, 619; 382/128, 173; 600/410
See application file for complete search history.

(56) References Cited

U.S. PATENT DOCUMENTS

| | | | |
|---|---|---|---|
| 5,768,156 A * | 6/1998 | Tautges et al. ..................... 703/2 |
| 5,889,524 A * | 3/1999 | Sheehan et al. ............... 345/419 |
| 6,016,153 A * | 1/2000 | Gueziec et al. ............... 345/441 |
| 6,119,069 A * | 9/2000 | McCauley ........................ 702/5 |
| 6,278,457 B1 | 8/2001 | Bernardini et al. |
| 6,301,496 B1 * | 10/2001 | Reisfeld ........................ 600/407 |
| 6,377,865 B1 | 4/2002 | Edelsbrunner et al. |
| 6,384,826 B1 * | 5/2002 | Bern et al. ..................... 345/441 |
| 6,456,867 B2 * | 9/2002 | Reisfeld ........................ 600/407 |
| 6,545,678 B1 | 4/2003 | Ohazama |
| 6,606,091 B2 | 8/2003 | Liang et al. |
| 7,023,432 B2 | 4/2006 | Fletcher et al. |
| 7,263,397 B2 | 8/2007 | Hauck et al. |
| 7,916,917 B2 * | 3/2011 | Dewaele et al. .............. 382/128 |
| 2004/0254437 A1 | 12/2004 | Hauck et al. |
| 2007/0047789 A1 * | 3/2007 | Dewaele ........................ 382/128 |
| 2007/0179375 A1 | 8/2007 | Fuimaono et al. |
| 2007/0225558 A1 | 9/2007 | Hauck et al. |
| 2007/0299353 A1 | 12/2007 | Harlev et al. |

OTHER PUBLICATIONS

Patel et al. "Stitching and Filling: Creating Conformal Facet Geometry". Published 2000.*
Park et al., "A Surface Reconstruction Algorithm Using Weighted Alpha Shapes," L. Wang and Y. Jin (Eds.): FSKD 2005, LNAI 3613, pp. 1141-1150, 2005. Springer-Verlag Berlin Heidelberg 2005.
Guo et al., "Surface Reconstruction Using Alpha Shapes," Computer Graphics Forum, vol. 16 (1997), No. 4, pp. 177-190.
International Search Report and Written Opinion for PCT/US2008/087121 mailed Feb. 5, 2009.

* cited by examiner

*Primary Examiner* — Kimbinh T Nguyen
(74) *Attorney, Agent, or Firm* — Dykema Gossett PLLC

(57) ABSTRACT

A method and system of generating a surface model of an anatomic structure includes a catheter with which a plurality of location data points are collected from the surface of the anatomic structure. The method and system further includes a computer system that is configured to receive the collected data points from the catheter and to compute the alpha shape of collected data points to thereby generate a surface model of the anatomic structure. The computer system may be further configured to process the computed alpha shape to generate a simplicial surface model of the anatomic structure.

42 Claims, 10 Drawing Sheets

METHOD AND SYSTEM FOR GENERATING SURFACE MODELS OF GEOMETRIC STRUCTURES

BACKGROUND OF THE INVENTION a. Field of the Invention

The present invention relates generally to a method and system for generating a surface model of a geometric shape. More particularly, the present invention relates to a computer-implemented method and system for generating a surface model of an anatomic structure, such as the heart, or a particular portion thereof, using surface point data.

b. Background Art

For many years, computer-implemented methods and systems have been used to generate surface models of geometric shapes including, for example, anatomic structures. More specifically, a variety of methods or techniques have been used to generate surface models of the heart and/or particular portions thereof (e.g., the heart as a whole or particular structures and/or portions thereof).

In one particular method, a plurality of sample points are taken on the surface of the structure being modeled that correspond to the relative location of the structure at that particular point. A surface model of the structure is then constructed based on the convex hull of the collection of sample points. In general terms, to collect the sample points, the surface of the structure is swept with a catheter and the various points on the surface of the structure visited by the catheter are recorded using known methods. These individual points collectively form a cloud of points (See, for example, FIG. 4). The convex hull of the cloud of points is then computed using known convex hull algorithms (See, for example, FIG. 5). The resulting convex hull shape estimates the boundary of the structure from the set of points, and therefore, provides a surface model of the structure. An advantage of this type of method/technique is that areas of the modeled structure that are not visited by the catheter, either because the catheter cannot reach the particular area or the clinician taking the samples did not collect samples from that area, are "filled in" during the model construction phase to create a complete model.

This advantage, however, may also be the principal disadvantage of these methods/techniques. For instance, because areas of the structure are "filled in", these techniques cannot reconstruct features of the modeled structure that are concave. Accordingly, with respect to the modeling of the heart, for example, these techniques cannot reconstruct certain anatomic features within the heart, such as papillary muscles or pulmonary vein ostia, which are both concave structures that would normally "indent" the heart surface model. Thus, while these techniques provide a good generalized model of the structure, they do not provide the level of detail that would be useful for many different applications.

Accordingly, there is a need for a method and system of generating surface models, such as, for example, cardiac surface models, that will minimize and/or eliminate one or more of the above-identified deficiencies.

BRIEF SUMMARY OF THE INVENTION

The present invention is directed to a method system of generating a surface model of a geometric structure, such as, for example, an anatomic structure.

The inventive method includes a number of steps. In a first step, a plurality of location data points from the surface of the anatomic structure being modeled are collected. In a second step, the alpha shape of the collected location data points is computed to generate a surface model of the structure.

In an exemplary embodiment, the computed alpha shape is then subjected to an additional step wherein it is processed to generate a simplicial surface model of the underlying structure. This processing step includes two principal substeps. First, at least a point of the alpha shape from which to begin the generation of the simplicial model is identified. In alternate embodiments, this point comprises, for example, a facet, edge, or vertex of the alpha shape. Second, the simplicial surface model is generated beginning with the identified point of the alpha shape.

The inventive system that performs the above described method comprises a catheter configured to collect the surface data points from the surface of the anatomic structure being modeled, and a computer system electrically connected to the catheter. The computer system is configured to receive the collected surface data points and to perform the remaining steps in the inventive method described above.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
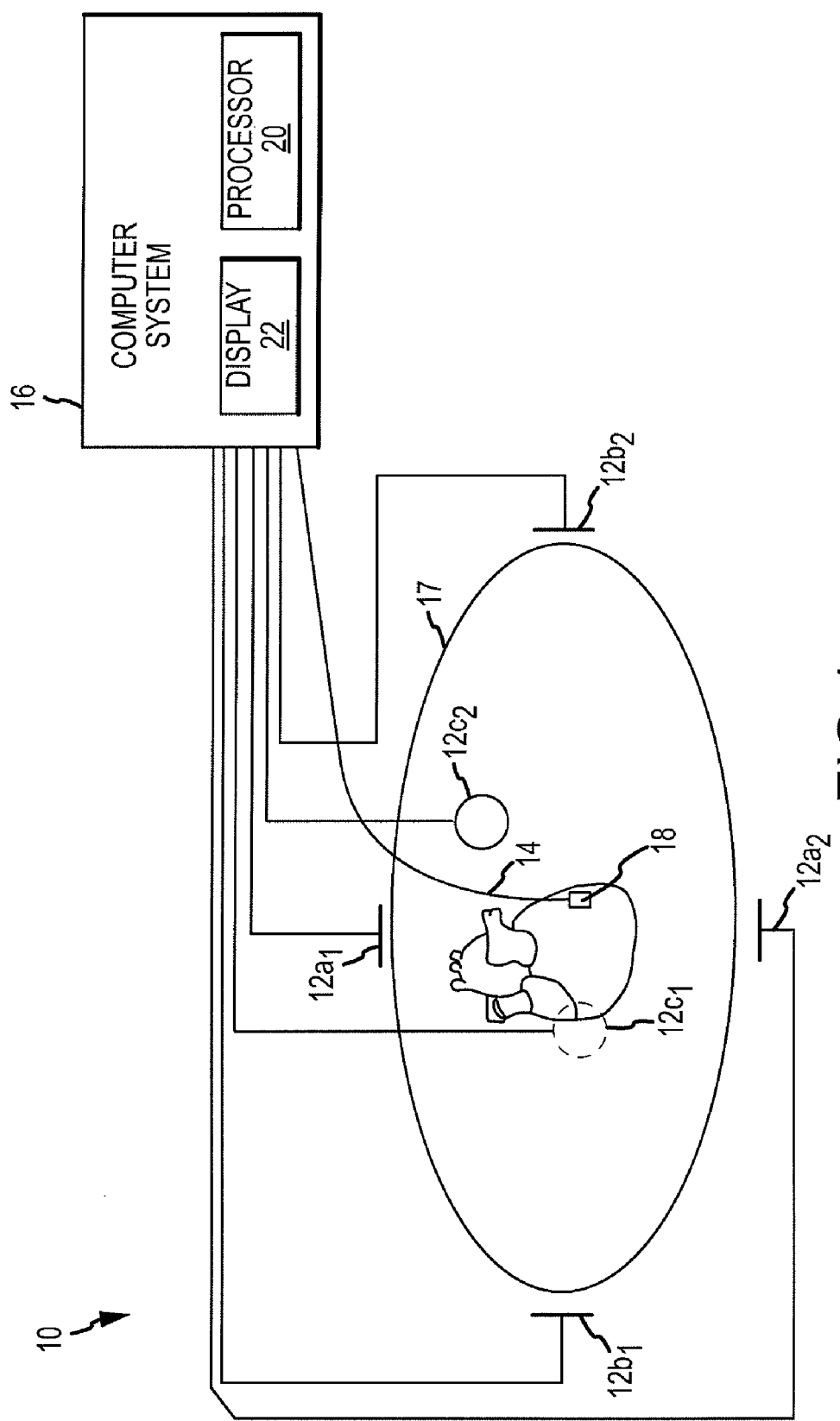
FIG. 1 is a schematic view of a system for generating surface models in accordance with the present invention.

Referring now to the drawings where like reference numerals are used to identify identical components in the various views, FIG. 1 illustrates an exemplary embodiment of a surface model generating system 10. It should be noted that while the following description focuses primarily on the use of system 10 in the generation of cardiac surface models, the present invention is not meant to be so limited. Rather, system 10, and the methods and techniques used therein, may be applied to the generation of surface models of any number of geometric structures, including anatomic structures other than the heart. Accordingly, system 10 is described below with particular reference to the modeling of the heart, and/or the structures thereof, for ease of description purposes only.

In an exemplary embodiment, system 10 comprises, in the most general sense, a plurality of surface patch electrodes 12, a catheter 14, and a computer system 16. As shown in FIG. 1, three sets of surface patch electrodes 12 (12a-12c) are placed on the body of a patient 17, which is represented in FIG. 1 by the oval shape labeled with reference number 17. The first set of surface patch electrodes, electrodes $12a_1$, $12a_2$, correspond to the X-axis; the second set, $12b_1$, $12b_2$, correspond to the Y-axis; and the third set, electrodes $12c_1$, $12c_2$, correspond to the Z-axis. These electrodes are strategically placed on the surface of a patient's body in such a way that the heart of the patient is disposed therebetween. As will be described more fully below, electrodes 12a-12c are configured to be selectively excited to create axes-specific electric fields in the body of the patient, which allows for the location of catheter 14 to be determined in three-dimensional space relative to the heart.

Figure 2:
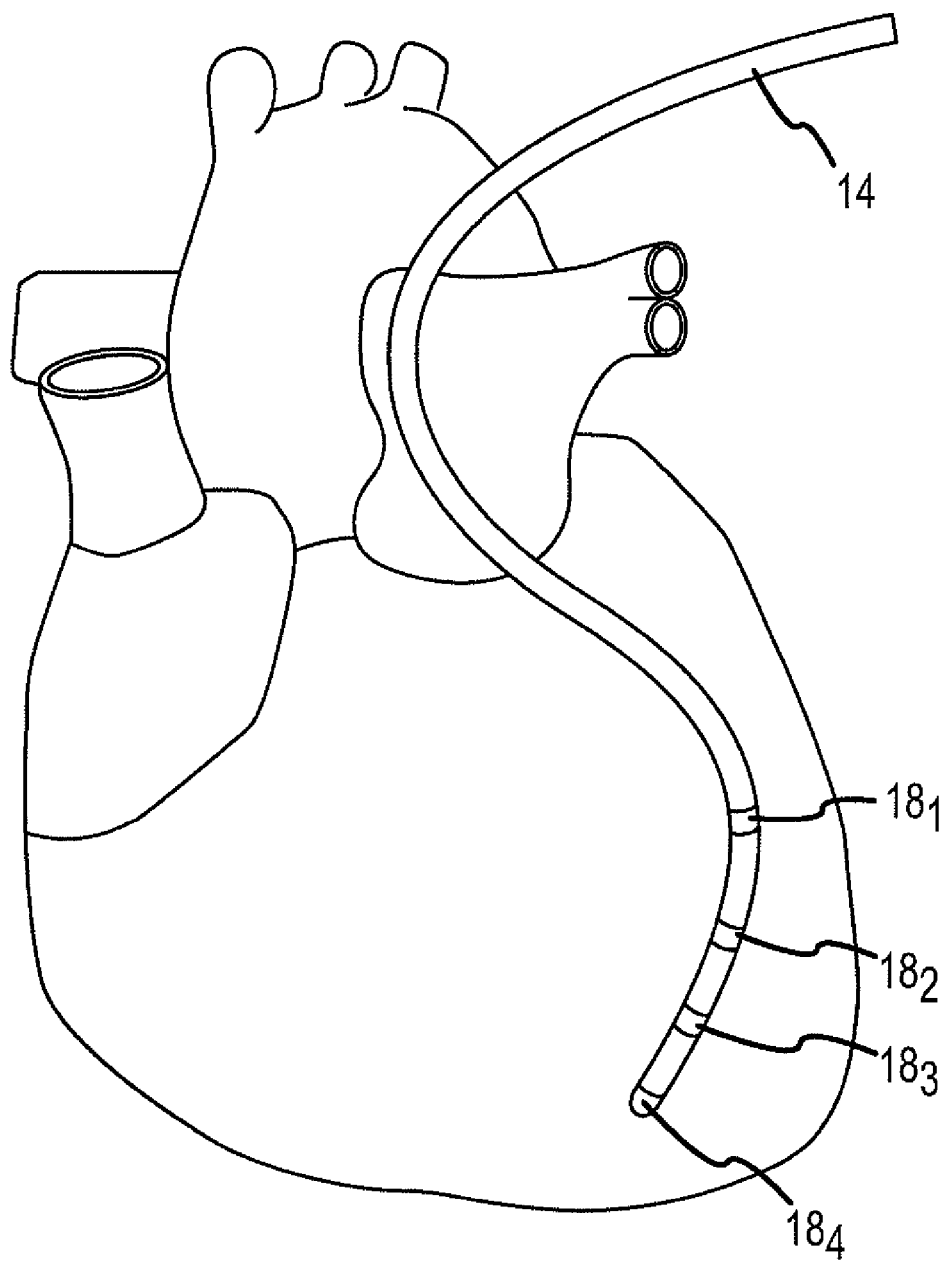
FIG. 2 is a schematic view of the catheter of the system illustrated in FIG. 1 disposed in the chamber of a heart.

With reference to FIGS. 1 and 2, catheter 14 will be described. Catheter 14 is configured to be inserted into a patient's body, and in some instances, into the patient's heart. Catheter 14 includes one or more electrodes 18 ($18_1, \ldots, 18_n$). Electrodes 18 may serve any number of purposes, such as, for example, to perform diagnostic or therapeutic procedures, electrophysiological studies, cardiac mapping, etc. For the sake of clarity, a single electrode 18 is depicted in FIG. 1 at the distal end of catheter 14 and it works in concert with patch electrodes 12 to provide, among other things, the location of catheter 14 to computer system 16 at certain points in time. Accordingly, catheter 14 can be used to collect location data points corresponding to the surface of the desired structure being modeled. These data points can then be used to construct a surface model of the desired structure. It should be noted that system 10 may further include other components known in the art that are not described in detail here, such as, for example, reference electrodes disposed within the heart or on the surface of the patient's body, switches responsively coupled to computer system 16 to excite surface electrodes 12, signal generators, etc. These additional components operate in conjunction with surface electrodes 12 and catheter electrode 18 to, among other things, determine the location information for catheter 14 and the various sampled data points corresponding to the surface of the structure that are provided to computer system 16. However, for purposes of clarity, these known components are not described in detail here.

Computer system 16 is electrically connected to electrodes 12a-12c and electrode 18. Computer system 16 is configured, in part, to cause electrodes 12a-12c to be selectively excited and to also record and process data collected by electrode 18. In an exemplary embodiment, and as will be described in greater detail below, computer system 16 includes a processor 20 configured to process data provided to computer system 16 by electrode 18, for example. Computer system 16 further includes a display 22 upon which models of anatomic structures generated by computer system 16 can be displayed, such as those generated by processor 20 based on the data provided by electrode 18. Additionally, various information relating to the modeled structure may also be displayed on display 22. While the illustrated embodiment depicts both processor 20 and display 22 as being integral parts of computer system 16, in alternate embodiments, either one or both of processor 20 and display 22 may be separate and distinct components of system 10. Accordingly, alternate arrangements of system 10, and computer system 16 thereof, in particular, remain within the spirit and scope of the present invention.

Figure 3:
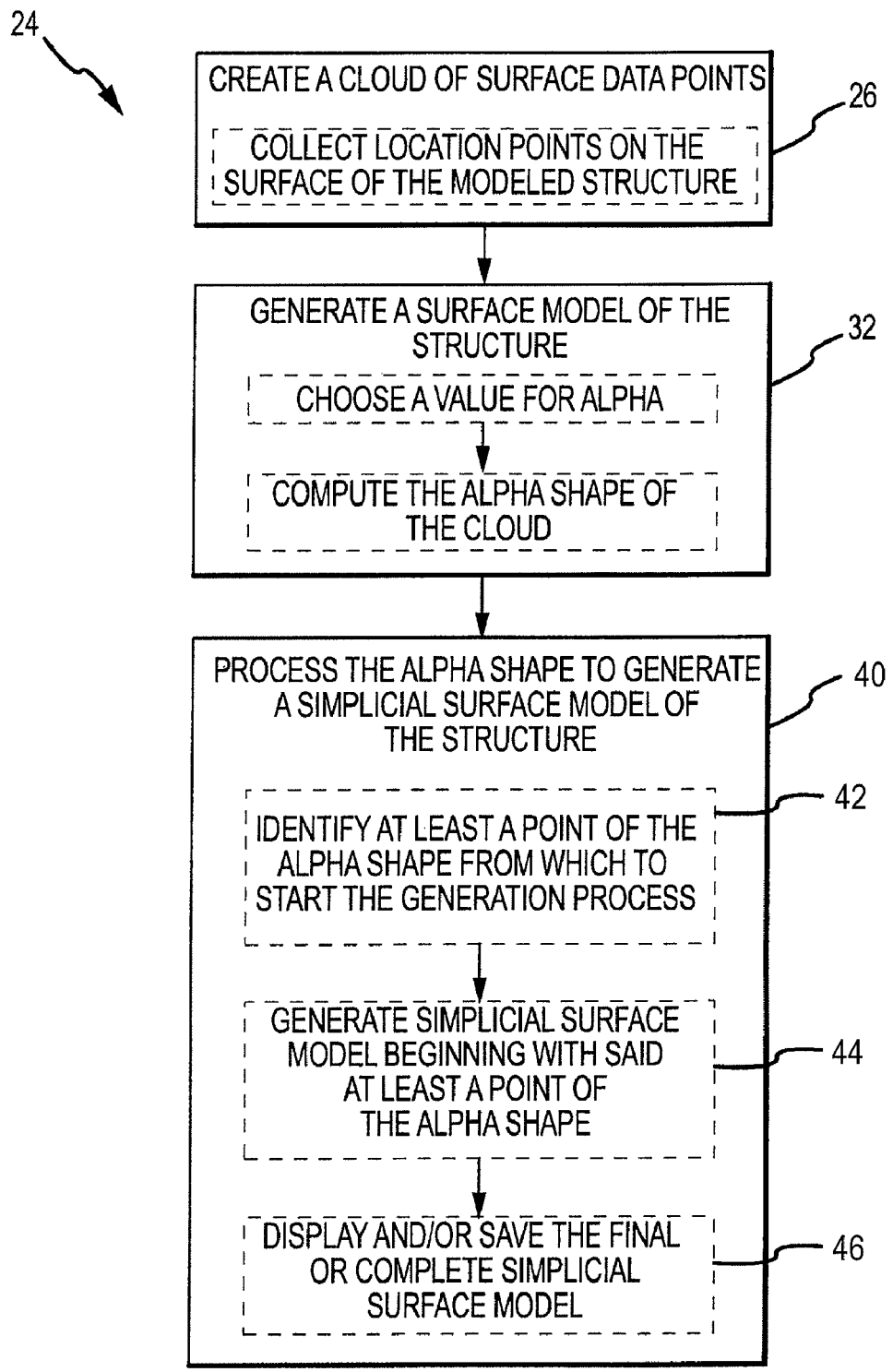
FIG. 3 is a flow chart illustrating a method of generating a surface model in accordance with the present invention.

Accordingly, in practice, patch electrodes 12, catheter 14, and computer system 16 function together to perform a surface model generating method 24 that ultimately generates a surface model of a desired structure, such as the heart, or at least a desired portion thereof (e.g., a particular chamber or a partial surface of a portion of the heart). FIG. 3 illustrates an exemplary embodiment of method 24 that will now be described in detail.

Figure 4:
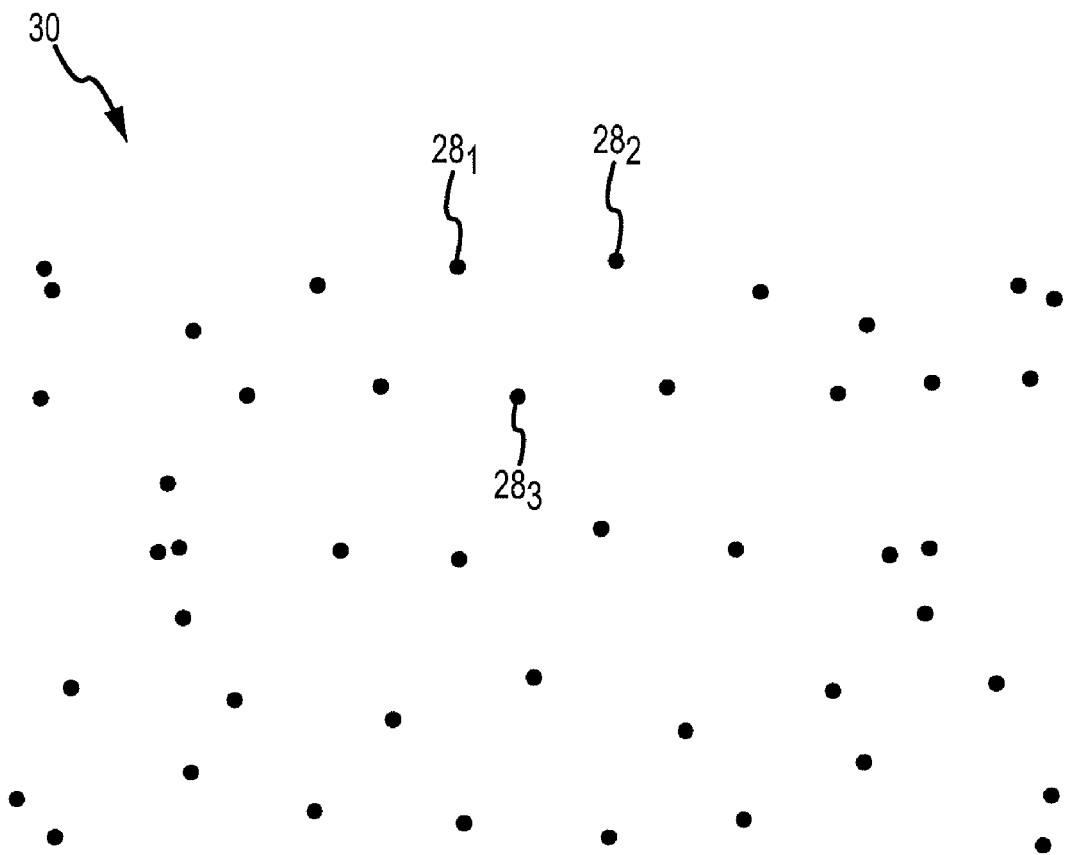
FIG. 4 is a schematic diagram of a collection of surface data points developed in the method illustrated in FIG. 3.

In a first step 26, a plurality of location data points corresponding to the surface of the desired structure are collected. Any number of methodologies may be utilized to collect these data points, such as, for example, the method described in U.S. Pat. No. 7,263,397 entitled *Method and Apparatus for Catheter Navigation and Location and Mapping in the Heart*, issued to Hauck et al. and assigned to St. Jude Medical, Atrial Fibrillation Division, Inc., which is hereby incorporated by reference in its entirety. In general terms that are more fully described in the referenced patent, the collection of data points is accomplished by a clinician/physician sweeping catheter 14, and more particularly, the portion thereof containing electrode 18, around the surface of the desired structure. As catheter 14 is swept about the particular area of interest, patch electrodes 12a-12c are selectively excited. The excitation of these electrodes creates an electric field(s) in the patient's body. As catheter 14 is swept, the location of electrode 18 is monitored by computer system 16 and using various known algorithms, the position of electrode 18 is determined and recorded by computer system 16 as a location point 28. The collection of location points 28 ($28_1, \ldots, 28_n$) taken over time results in the formation of a cloud of points 30. FIG. 4 is illustrative of a point cloud corresponding to a particular desired structure to be modeled, which in this instance is a portion of the inner surface of the left atrium of the heart.

It should be noted that while only one method of collecting location data points has been described in detail, the present invention is not meant to be limited to such a methodology. Rather, any number of methodologies may be used to collect location data points and these methodologies remain within the spirit and scope of the present invention. Therefore, the above-described method is provided for exemplary purposes only.

Figure 6:
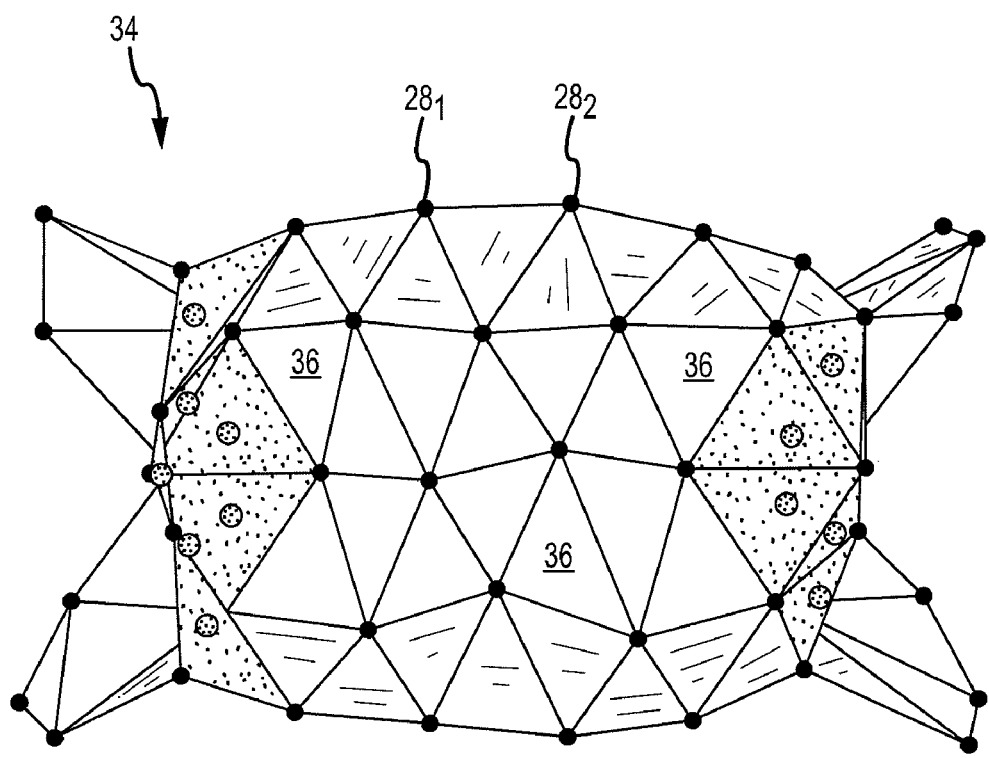
FIG. 6 is a schematic view of a computed alpha shape of the collection of points illustrated in FIG. 4.

In a second step 32 of method 24, the plurality of location points 28 are processed by computer system 16 to generate a surface model of the desired structure—be it a complete surface model of the heart, a particular chamber, or a partial surface thereof, for example. In the embodiment illustrated in FIG. 3, this step is accomplished by computer system 16, and processor 20, in particular, using an alpha shape algorithm. Accordingly, in this step, the points 28 of point cloud 30 are subjected to an alpha shape algorithm to compute an alpha shape 34 corresponding to the desired structure. FIG. 6 is illustrative of the alpha shape of point cloud 30 depicted in FIG. 4. Any known alpha shape algorithm may be used to compute alpha shape 34. Regardless of the specific algorithm used, the algorithm triangulates points 28 to form one or more facets 36 that, when taken together, create a model of the desired structure. Accordingly, as is illustrated in FIG. 6, the alpha shape created by this process is typically a multi-faceted model wherein each facet 36 ($36_1, \ldots, 36_n$) comprises a triangle, and therefore, has three edges 38. Once alpha shape 34 has been computed, it may be displayed on display 22 and/or saved to a storage medium resident within computer system 16 or otherwise part of system 10.

Figure 5:
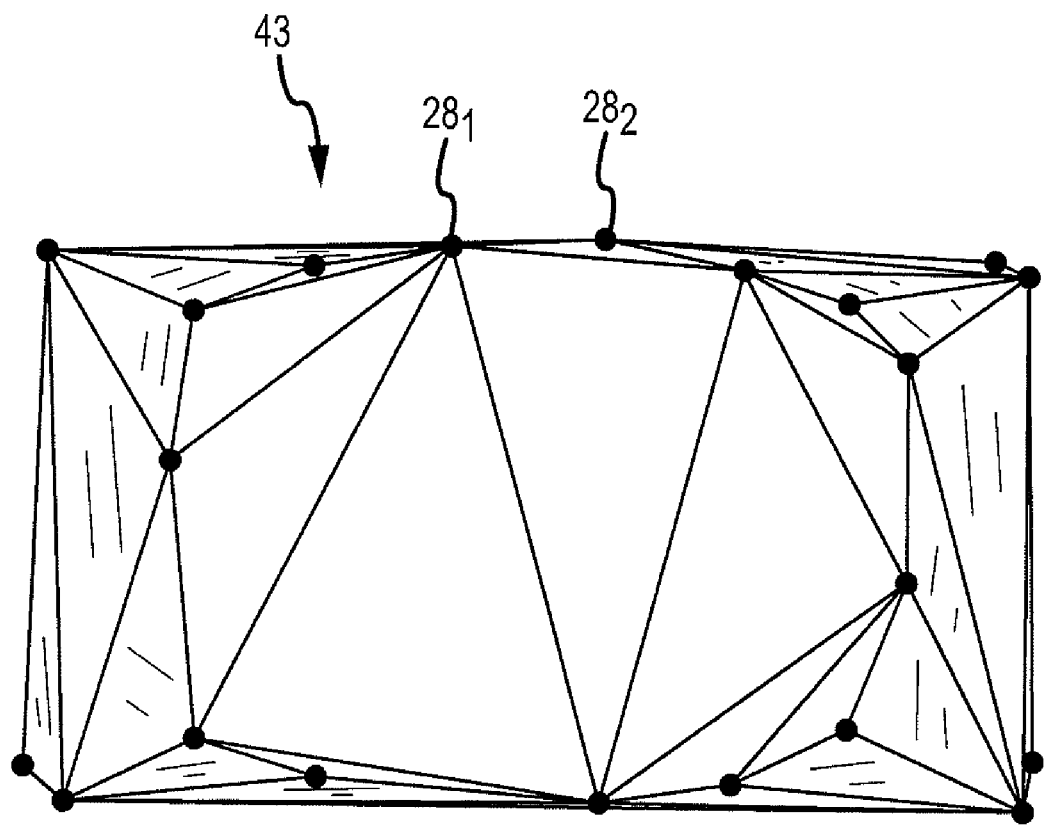
FIG. 5 is a schematic diagram of a computed convex hull of the collection of points illustrated in FIG. 4.

As those of ordinary skill in the art will appreciate, the more facets in the model, the more detail of the underlying structure is represented. The number of facets, and therefore, the level of detail, depends substantially on the particular value of alpha (a measure of distance on the order of millimeters) that is used in the algorithm. For example, if alpha is zero, the alpha shape is simply the original set of points that comprise cloud 30. On the other hand, if alpha is infinity, the alpha shape is simply the convex hull of cloud 30. Thus, if the value of alpha is relatively small, the model will have a greater degree of detail (i.e., more facets 36) and may allow for concave surfaces in the structure to be modeled. The increased level of detail and the ability to potentially model concave surfaces provide a significant advantage over conventional surface model generating systems such as those described in the Background section above. This point may be realized by comparing the convex hull of point cloud 30, which is illustrated in FIG. 5, with the alpha shape of point cloud 30, which is illustrated in FIG. 6. One of ordinary skill in the art will recognize and appreciate that the alpha shape provides a greater level of detail and a higher degree of accuracy as to the actual surface of the model structure as compared to the convex hull. Accordingly, a value of alpha between zero and infinity is chosen or otherwise determined and is used by the alpha shape algorithm to generate a model having a particular degree of detail. Typically, the alpha value will be on the order of five to ten millimeters, however, the present invention is not meant to be so limited. Rather, in alternate embodiments, alpha values that are more or less than five to ten millimeters may be used. In an exemplary embodiment, the value of alpha is determined by the clinician/physician choosing a desired value. Alternatively, one or more predetermined default values of alpha may be programmed into computer system 16 and/or processor 20, which may or may not provide the clinician/physician the ability to choose the value.

In one alternate exemplary embodiment, rather than computing the alpha shape as described above, alpha shape 34 may be constructed wherein different regions of the computed shape have different levels of detail. In such an embodiment, each point 28 in point cloud 30 is assigned a weight. The weight is a factor that determines how much detail the clinician/physician wants to preserve in that particular region of the desired structure. If a greater amount of detail is desired, the weight is lower, and conversely, if less detail is desired, the weight is greater. Accordingly, once all of the points are collected, each point 28 is assigned a weight that may be, for example, inversely proportional to the local point density surrounding that particular point, directly proportional to the distance to the closest neighboring point 28, or directly proportional to the average distance of a particular number of closest points 28. Thus, the overall level of detail of the alpha shape depends on the local density of points 28 in each region of the desired structure. Accordingly, depending on the weights assigned to each point, particular portions of the surface model may have different levels of detail. This concept is commonly referred to as weighted alpha shapes, and thus, in such an embodiment, alpha shape 34 is computed as a weighted alpha shape.

Irrespective of whether a "regular" alpha shape or "weighted" alpha shape model is constructed, it is desirable that each edge 38 of each facet 36 be shared by no more than one other neighboring or adjacent facets 36 (i.e., each edge of the alpha shape is shared by no more than two adjacent facets). However, due to the level of detail the alpha shape algorithm may provide, it is possible that one or more edges 38 of a facet 36 in the completed/generated model will be shared by more than one other adjacent facet 36. This results in a surface model that is not manifold, which makes it difficult, if not impossible, to determine what the true outer surface of the model is and what surface in the model is actually inside the outer surface (in other words, it is difficult to tell in which direction the surface is actually facing). In the event that this occurs, a postprocessing procedure is required to "clean up" the generated model in order to provide a smooth simplicial surface model of the desired structure. In the context of this particular application, the term "simplicial surface" is intended to mean "a connected, orientable, and locally a two-dimensional manifold surface" (i.e., each edge in the alpha shape is shared by at most two facets). In other words, for each facet 36 having at least one edge that is shared by two or more neighboring/adjacent facets 36, it must be determined which of the adjacent facets 36 will be kept as part of the final simplicial surface model, and which ambiguous adjacent facet(s) 36 will be discarded and not made part of the simplicial surface model (See, for example, FIG. 6 wherein several "ambiguous adjacent" facets are identified by stippling and are discarded in the postprocessing procedure). This process ensures that in the simplicial surface model, each edge 38 of each facet 36 is shared by no more than one neighboring facet 36. Accordingly, in an exemplary embodiment, surface model generating method 24 includes a third step 40 that comprises a postprocessing procedure to generate a simplicial surface model 41 that is based on computed alpha shape 34.

Figure 7:
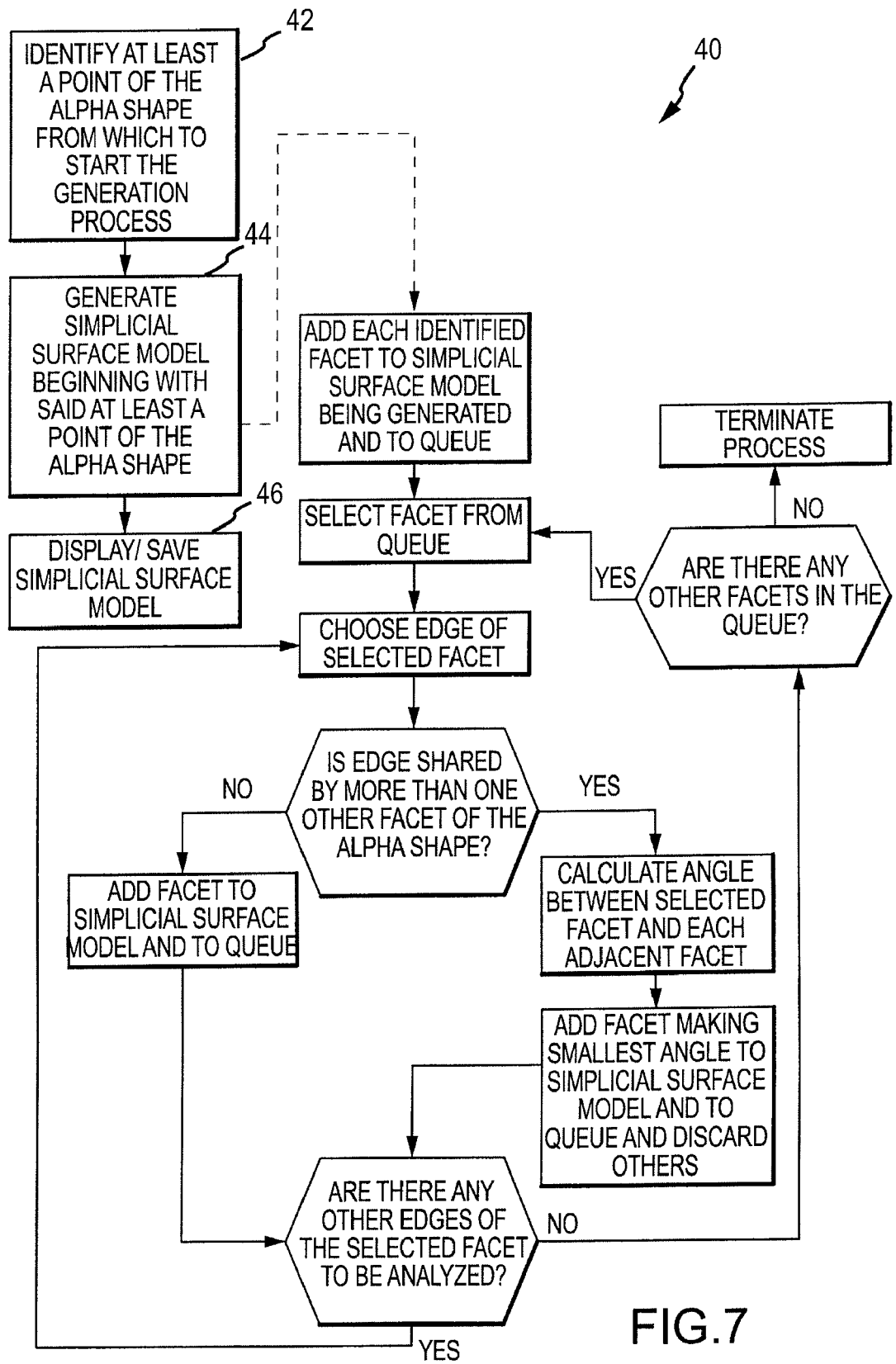
FIG. 7 is a flow chart illustrating a method of generating a simplicial surface model in accordance with the present invention.
Figure 8:
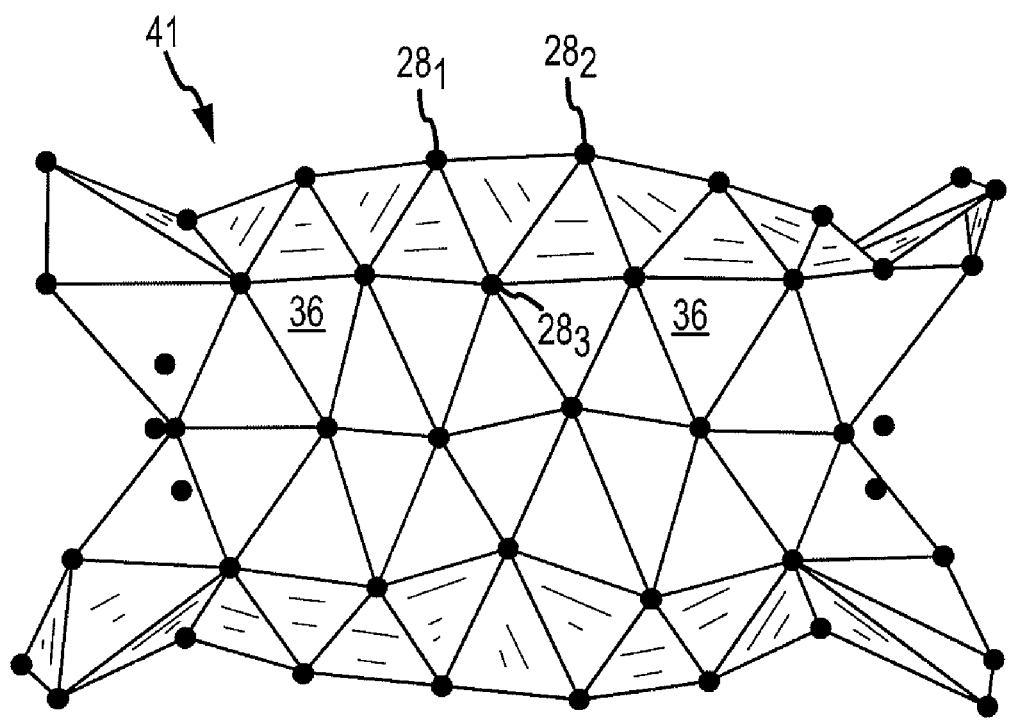
FIG. 8 is a schematic view of a simplicial surface model generated from the alpha shape illustrated in FIG. 6.

Third step 40, which is illustrated in FIG. 3 and in greater detail in FIG. 7, is performed by computer system 16, and more particularly, processor 20, and includes processing alpha shape 34 with a simplicial surface or "skin" algorithm to generate a smooth, simplicial surface model 41 (best shown in FIG. 8). In an exemplary embodiment, third step 40 includes a series of substeps.

In a first substep 42, the algorithm identifies at least a point of alpha shape 34 from which to begin the generation process. In an exemplary embodiment, this "start point" is at least a point of the alpha shape that is shared by the convex hull of point cloud 30. In alternate embodiments, rather than or in addition to identifying points or vertices of alpha shape 34 that are shared by the convex hull, the algorithm identifies one or more edges 38 of alpha shape 34, and/or, most commonly, one or more facets 36 of alpha shape 34 that are shared by the convex hull.

In one exemplary embodiment, this identification step is accomplished by computing the convex hull of point cloud 30, and then comparing the convex hull with alpha shape 34. In such an embodiment, the convex hull of point cloud 30 is computed using one of any number of known convex hull algorithms. The computed surface model generated by the convex hull algorithm, which is illustrated in FIG. 5 and is identified therein as reference numeral 43, represents the connections between the most exterior points 28 in point cloud 30, and therefore, a model comprising the outermost surfaces of the desired structure is generated. In this particular embodiment, once convex hull 43 has been computed, it is compared with alpha shape 34. In an exemplary embodiment, each facet 36 of alpha shape 34 that is also part of or shared by convex hull 43 is identified and, for reasons more fully described below, placed into a queue. These "shared" facets 36 are identified to provide a starting point for generating simplicial surface model 41 since these facets 36 are known to be on the outside surface of the structure because, by definition, anything on the convex hull is necessarily on the outside surface. Thus, by identifying such facets, the algorithm knows that the identified facets are correctly oriented and on the outer surface of the model. Accordingly, in addition to being placed in the queue, the identified facets are also added to the final simplicial surface model 41 illustrated in FIG. 8 that the simplicial surface algorithm is computing/generating.

It should be noted, however, that the convex hull need not necessarily be computed separately in order to identify the shared points, edges, or facets. In an alternate embodiment, whether one or more facets 36 of alpha shape 34, for example, are shared by the convex hull can be determined by alpha shape 34 itself. More specifically, each facet 36 has two opposite vertices in the underlying triangulation that is performed by the alpha shape algorithm, which has essentially divided all of three-dimensional space into tetrahedra. Alpha shape facets 36 that are also on the convex hull (i.e., shared by the convex hull) will have the "point at infinity" as one of their two opposite vertices. This theoretical point is part of all the exterior tetrahedra of the convex hull, and therefore, the simplicial surface algorithm can tell whether a particular facet 36 is shared by the convex hull by determining whether one of its opposite vertices is the "point at infinity." Accordingly, the present invention is not limited to one singular way of identifying points, edges, and/or facets of alpha shape 34 that are shared by the convex hull.

Figure 9:
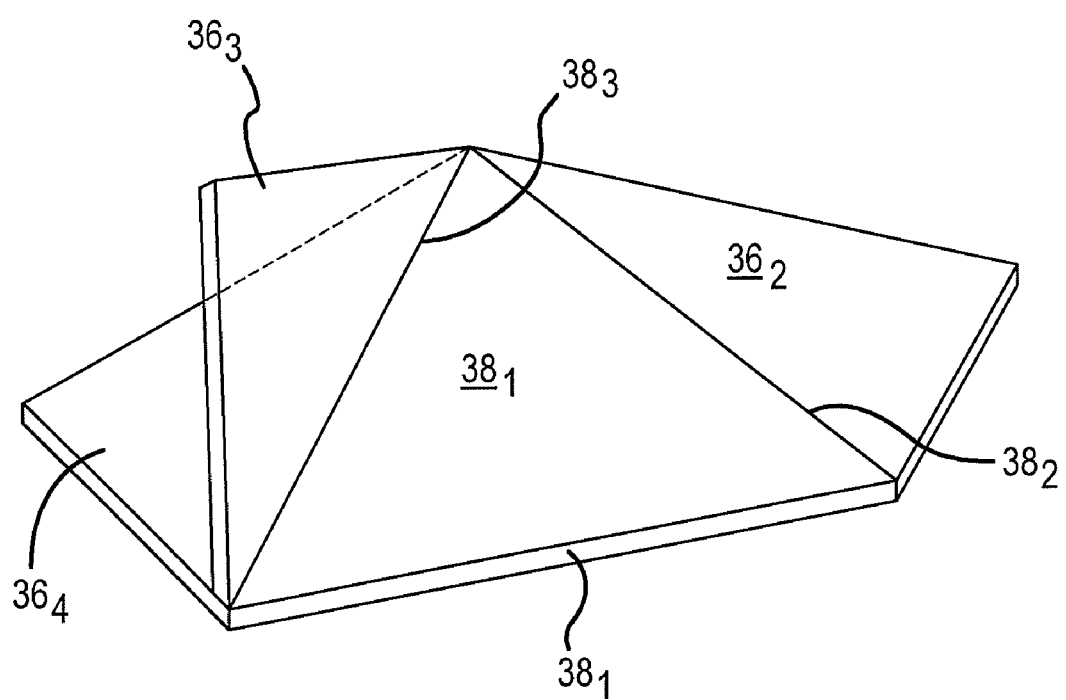
FIG. 9 is a schematic view of a portion of the surface of an alpha shape such as that illustrated in FIG. 6.

Whether the shared facets are determined by actually comparing the computed convex hull 43 and the alpha shape 34 or by evaluating alpha shape 34 alone, once one or more of the shared facets have been identified, a second substep 44 is performed on each facet in the queue (and those to be subsequently added to the queue), one at a time, to generate the final simplicial surface model. In this substep, the algorithm takes and analyzes a first facet, and for each edge thereof determines how many neighboring or adjacent facets share the particular edge. A facet that shares an edge with at least one other facet will hereinafter be referred to as an "adjacent facet." If the edge is shared by no other facets, then, generally speaking, that edge is left as a boundary edge in model 41. If the edge is shared by only one other adjacent facet, then that adjacent facet is added to model 41 and also added to the queue. If, however, two or more facets of alpha shape 34 share the particular edge, the algorithm must choose which adjacent facet to include in model 41. To better illustrate this process, FIG. 9 depicts a partial view of the surface of an alpha shape, though not necessarily alpha shape 34 illustrated in FIG. 6, wherein one facet 36, facet $36_1$, has been identified as a "shared" facet, and includes edges $38_1$-$38_3$. With respect to edge $38_1$, since no other facets share this edge, edge $38_1$ would be left as a boundary of the simplicial surface model 41. With respect to edge $38_2$, since this edge is shared by only one adjacent facet, facet $36_2$, this facet would be added to the simplicial surface model 41 and placed in the queue for future analysis. With respect to edge $38_3$, since this edge is shared by two facets 36, facet $36_3$ and facet $36_4$, one of these facets must be selected by the algorithm to be added to the simplicial surface model 41 and the other one will be discarded.

In the instance wherein an edge 38 of a facet 36 is shared by two or more other adjacent facets 36, in one exemplary embodiment, the algorithm considers each adjacent facet 36 and then chooses the one that is the furthest outside or, in other words, closest to the convex hull. In order to determine which is the furthest outside, the algorithm looks at the angle between the facet being evaluated/analyzed (i.e., facet $36_1$, for example) and the respective adjacent facets 36 (i.e., facets $36_3$ and $36_4$, for example) and chooses the adjacent facet 36 making the smallest angle with facet $36_1$, (i.e., the smallest dihedral angle).

Figure 10A:
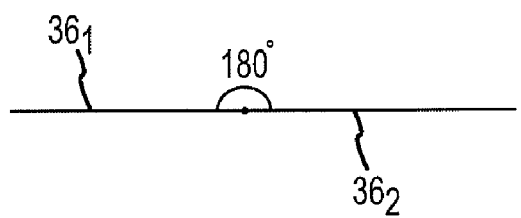
FIGS. 10a-10d are diagrammatic views of various arrangements of adjacent facets of the alpha shape illustrated in FIG. 6.
Figure 10B:
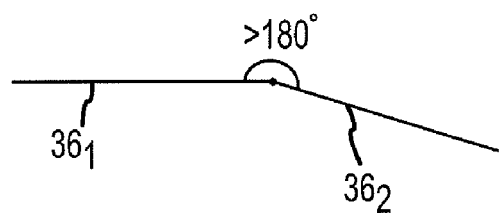
Figure 10C:
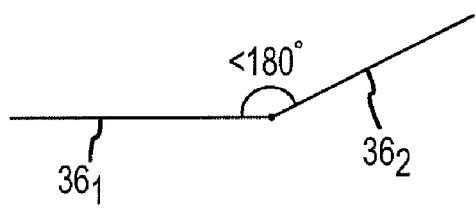
Figure 10D:
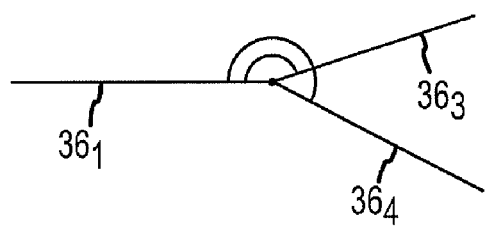

This methodology may be better understood with reference to FIGS. 10a-10d. With respect to FIG. 10a, adjacent facets $36_1$ and $36_2$ form a flat surface. Accordingly, the dihedral angle between these two facets would be 180 degrees. Alternatively, with respect to FIG. 10b, the adjacent facet $36_2$ is disposed "interior" to facet $36_1$, and therefore, its dihedral angle will be greater than 180 degrees. Conversely, with respect to FIG. 10c, adjacent facet $36_2$ is disposed outside of facet $36_1$, and therefore, its dihedral angle is less than 180 degrees. In any of FIGS. 10a-10c, because facet $36_2$ is the only other facet sharing the particular edge with facet $36_1$, facet $36_2$ would be added to the simplicial surface model 41 in each instance. However, FIG. 10d illustrates an instance where two facets, facets $36_3$ and $36_4$, share a particular edge. Accordingly, only one of facets $36_3$ and $36_4$ may be selected to be part of the simplicial surface model 41. Based on the criteria described above, since facet $36_3$ makes a dihedral angle that is less than that made by facet $36_4$, facet $36_3$ is chosen to be part of the simplicial surface model 41. Therefore, facet $36_3$ (or the particular facet chosen) would be oriented to match facet $36_1$ (i.e., its vertices are reversed if they do not traverse the vertices of the common edge in the opposite order as the selected facet does), added to the simplicial surface model 41 being generated, and also added to the queue for later analysis. The other adjacent facets 36 that share the particular edge of facet $36_1$ and that were not chosen (i.e., facet $36_4$), would be discarded.

In an exemplary embodiment, it may be desirable to set a maximum threshold for an acceptable dihedral angle so that the algorithm leaves a boundary in the model instead of creating sharp creases and going into cavities of alpha shape 34. In one embodiment, this threshold angle is, for exemplary purposes only, 240 degrees. Therefore, if the angle between the facet being analyzed and any adjacent facet is greater than 240 degrees, that adjacent facet is not added to the model. If no other facets 36 share that particular edge or if other facets 36 share the edge but fail to make an angle that is within the predetermined threshold, the particular edge being shared by these two or more facets is left as a boundary in the model.

Once each edge 38 of facet $36_1$ (or whichever facet 36 is being evaluated) has been analyzed as set forth above, the algorithm determines whether there are any other facets 36 in the queue. If there are, the algorithm takes the next facet 36 in the queue and performs the same analysis. Once the last facet 36 in the queue has been analyzed, the algorithm terminates, indicating that all allowable neighboring/adjacent facets 36 have been propagated and added to the simplicial surface model 41.

If, after the simplicial surface model generation process is complete, the generated simplicial surface model 41 includes undesirable voids or holes, these voids or holes may be optionally filled in using various algorithms to generate a smoother or more complete model. One exemplary embodiment of such an algorithm has been described in great detail in U.S. patent application Ser. No. 11/715,922 entitled "*Method and System for Repairing Triangulated Surface Meshes.*" This exemplary algorithm generally includes the following steps. First, a void or hole in simplicial surface model 41 is identified. The hole is defined by a plurality of hole edges (i.e., boundary edges of facets 36 bordering the hole, for example). Second, a plurality of hole vertices that define the plurality of hole edges are determined. Third, the hole is filled in using one or more triangular facets, not unlike facets 36 described above. This "filling-in" step includes a series of substeps. For example, in one substep, a pair of hole vertices that are not connected by a hole edge are selected. In one embodiment, this substep includes selecting the closest pair of hole vertices. Alternatively, this substep includes locating the smallest interior angle of the plurality of hole edges, and selecting a pair of hole vertices that define a pair of the plurality of hole edges that intersect at the smallest interior angle of the plurality of hole edges. Once a pair of hole vertices are selected, in subsequent substep, a fabricated edge that connects the selected pair of hole vertices is defined. Next, the algorithm determines whether one or more triangles are formed using the defined fabricated edge. If one or more triangles are formed, the newly formed triangles are defined as new facets and are added to simplicial surface model 41. If, however, one or more triangles are not formed, the algorithm continues to define fabricated edges until one or more triangles are formed. This process is then repeated until the identified hole, and any other hole in model 41, has been filled in to create a void-free simplicial surface model.

Additionally, in the event the generated simplicial surface model has more than one component, the clinician/physician may be given choices or options as to what to do with the multiple components. These choices or options may include, without limitation, keeping all components as part of the model, keeping only the component having the largest surface area, or trying to connect the components using a stitching algorithm.

In a final substep 46 of third step 40, the complete or final simplicial surface model 41 is displayed on display 22 and/or is saved to a storage medium resident in computer system 16 or elsewhere in system 10 for later use.

It should be noted that while substeps 42 and 44 were described above with particular reference to facets 36 of alpha shape 34 that are shared by the convex hull, the present invention is not so limited. Rather, in certain instances, there may not be any facets 36 shared by the two models. Instead, an edge 38 of a facet 36 may be part of or shared by the convex hull. In that instance, and as briefly described above, the algorithm considers all of the shared edges 38 and chooses the facet 36 of alpha shape 34 sharing edge 38 that makes the smallest dihedral angle with the facets of the convex hull that also share edge 38. This facet is added to the queue and the simplicial surface model being created, and the process and methodology then continues as described above.

In another instance, the convex hull and alpha shape 34 may not share any facets 36 or any edges 38, but rather one or more points or vertices 28 of alpha shape 34 may be part of or shared by the convex hull. In this situation, which was also briefly described above, the algorithm considers all of these points and then chooses the point 28 with an edge 38 making the smallest dihedral angle with an edge of the convex hull sharing that point 28. This edge 38 is then temporarily projected onto said convex hull edge, in order to compute dihedral angles, and the algorithm chooses the new facet 36 that makes the smallest dihedral angle with the facets of the convex hull that also share the projected edge 38. The original facet 36 is then added to the simplicial surface model being generated, and to the queue. The process and methodology then continues as described above.

In still another instance, a particular facet 36 that is known to be part of the simplicial surface is chosen from which to start the above described process. More specifically, a facet 36 of alpha shape 34 may be chosen that may or may not be shared by the convex hull, and may be manually chosen by a clinician/physician (i.e., the alpha shape is displayed on display 22 and the clinician/physician may click on the facet using a computer mouse or the like). Alternatively, the facet may be chosen semi-automatically by the clinician/physician rotating the three-dimensional viewing window within which alpha shape 34 is disposed and that is displayed on display 22, for example, to a desired angle, at which point the algorithm would find and choose one or more facets visible from the clinician/physician's viewpoint from which to begin the generating process. In either case, once a facet 36 is chosen, the process or methodologies described above simply continue in the same manner.

In an exemplary embodiment, the methodologies described above may be used to generate a somewhat dynamic model of the heart by generating separate models for a plurality of different timepoints in the cardiac cycle of the heart. Accordingly, using the various steps of the process described above, surface points of the heart are collected during the different timepoints in the cardiac cycle, thereby creating point clouds 30 for each timepoint in the cardiac cycle. Using the methodologies described above, surface models (simplicial or otherwise) can be generated for each point cloud and then the models can be used together or separately for various purposes.

Accordingly, once the various steps and substeps of the methodologies set forth above are performed, an orientable and locally manifold surface model (simplicial surface model 41) having improved detail is generated. This model can then be used to assist a clinician/physician in the performance of various diagnostic and therapeutic procedures, as well as to provide improved cardiac mapping functionality. Therefore, the methods and/or system described above may be employed in any number of visualization, navigation, and/or mapping systems, such as the EnSite NavX® system commercially offered by St. Jude Medical, Inc., and described in detail in U.S. Pat. No. 7,263,397 entitled *Method and Apparatus for Catheter Navigation and Location and Mapping in the Heart*, which was incorporated by reference above.

Although only certain embodiments of this invention have been described above with a certain degree of particularity, those skilled in the art could make numerous alterations to the disclosed embodiments without departing from the spirit or scope of this invention. For example, other processes may be used to collect points 28 that form point cloud 30. Further, the alpha shape acquired by the alpha shape algorithm may be subjected to intermediate filtering processes to extract a clean alpha shape. Still further, other processes or guidelines may be used to choose which neighboring/adjacent facet is ultimately added to the final output surface model. Yet still further, various algorithms not specifically identified above may be used to carry out or otherwise perform the described functionality. Additionally, all directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method of generating a three-dimensional surface model of an anatomic structure, the method comprising
   collecting, by a catheter-mounted device, a plurality of location data points from the surface of said anatomic structure; and
   computing, by a processor of a computer system, a three-dimensional alpha shape of said collection of location data points to generate a three-dimensional surface model of said anatomic structure.

2. The method of claim 1, wherein said computing step comprises the substep of acquiring, by said processor, a value of alpha prior to computing said alpha shape.

3. The method of claim 1, further comprising processing, by said processor, said computed alpha shape to generate a three-dimensional simplicial surface model of said structure.

4. The method of claim 3 wherein said processing step comprises the substeps of
- computing a three-dimensional convex hull of said plurality of data points;
- comparing said alpha shape with said convex hull;
- identifying, based on said comparison of said alpha shape with said convex hull, at least a point of said alpha shape that is shared by said convex hull; and
- generating, by said processor, said simplicial surface model beginning with said at least a point of said alpha shape shared by said convex hull.

5. The method in accordance with claim 4 wherein said identifying step comprises identifying, by said processor and based on said comparison of said alpha shape with said convex hull, each facet of said alpha shape that is shared by said convex hull, and said generating step comprises
- adding, by said processor, each identified facet to said simplicial surface model;
- analyzing, by said processor, each edge of said identified facets to determine the number of adjacent facets sharing each of said edges;
- selecting, by said processor and for each of said edges, one adjacent facet to be added to said simplicial surface model; and
- adding, by said processor, said selected adjacent facets to said simplicial surface model and discarding, by said processor, the remaining adjacent facets.

6. The method in accordance with claim 5 wherein said analyzing step comprises analyzing, by said processor, each facet one at a time.

7. The method in accordance with claim 5 wherein selecting step comprises the substeps of calculating, by said processor, the dihedral angle between said facet being analyzed and each of said adjacent facets, and choosing, by said processor, said one adjacent facet forming the smallest dihedral angle.

8. The method in accordance with claim 7, further comprising discarding, by said processor, an adjacent facet forming a dihedral angle that is greater than a predetermined threshold angle.

9. The method in accordance with claim 5 further comprising placing, by said processor, each of said identified facets and each of said selected adjacent facets in a queue, and said analyzing step further comprising analyzing, by said processor, each facet in said queue.

10. The method in accordance with claim 9 wherein said analyzing step comprises selecting, by said processor, a first facet in said queue to be analyzed and analyzing, by said processor, said facet; said method further comprising
- determining, by said processor and after said first facet has been analyzed, whether additional facets are in said queue; and
- if at least one additional facet is in said queue, selecting, by said processor, a second facet in said queue to be analyzed, otherwise, terminating, by said processor, said generating step if no other facets are in said queue.

11. The method in accordance with claim 4 wherein said identifying step comprises identifying, by said processor and based on said comparison of said alpha shape with said convex hull, an edge of said alpha shape that is shared by said convex hull, and said generating step comprises
- choosing, by said processor, a facet of said alpha shape sharing said edge that makes the smallest dihedral angle with one of the facets of said convex hull also sharing said edge; and
- adding, by said processor, said chosen facet to said simplicial surface model and discarding, by said processor, other facets of said alpha shape sharing said edge.

12. The method in accordance with claim 4 wherein said identifying step comprises identifying, by said processor and based on said comparison of said alpha shape with said convex hull, a point of said alpha shape that is shared by said convex hull, and said generating step comprises
- choosing, by said processor, one of a facet and an edge of said alpha shape sharing said point and making the smallest dihedral angle with one of a facet and an edge of said convex hull also sharing said point; and
- adding, by said processor, said chosen one of said facet and said edge to said simplicial surface model and discarding, by said processor, the other facets and edges of said alpha shape sharing said point.

13. The method in accordance with claim 3 wherein said processing step comprises the substeps of
- identifying at least a point of said alpha shape from which to generate said three-dimensional simplicial surface model; and
- generating, by said processor, said simplicial surface model beginning with said at least a point of said alpha shape; wherein
- said identifying step comprises choosing, by said processor, a facet of said alpha shape known to be part of the simplicial surface that is also visible from a user-specified viewpoint, and
- said generating step comprises
  - adding, by said processor, said facet to said simplicial surface model;
  - analyzing, by said processor, each edge of said facet to determine the number of adjacent facets sharing each edge of said facet;
  - selecting, by said processor and for each edge, one adjacent facet to be added to said simplicial surface model; and
  - adding, by said processor, said selected adjacent facets to said simplicial surface model and discarding, by said processor, the remaining adjacent facets.

14. The method of claim 3 wherein said processing step further comprises executing, by said processor, an algorithm to fill-in voids in said simplicial surface model.

15. The method of claim 3 wherein said processing step results in the generation of a three-dimensional simplicial surface model having more than one component, the method further comprising one of the steps of keeping, by said processor, the entire generated simplicial surface model, retaining, by said processor, only the component having the largest surface area, and stitching, by said processor, said components together.

16. The method of claim 1 further comprising the step of assigning, by said processor, each of said plurality of data points a respective weight, said computing step comprising computing, by said processor, a weighted three-dimensional alpha shape of said plurality of data points.

17. A system for generating a three-dimensional surface model of an anatomic structure comprising
- a catheter having a device configured to collect a plurality of surface data points from at least a portion of the anatomic structure;
- a computer system having a processor electrically connected to said device, wherein said processor is configured to receive said collected surface data points from said device and to compute a three-dimensional alpha shape corresponding to said collected surface data points, said alpha shape representing a three-dimensional surface model of said portion of the anatomic structure.

18. The system in accordance with claim 17 wherein said processor is further configured to process said computed alpha shape to generate a three-dimensional simplicial surface model of said anatomic structure.

19. The system in accordance with claim 17 wherein said processor is configured to
   compute a three-dimensional convex hull of said plurality of surface data points;
   compare said alpha shape with said convex hull; and
   identify, based on said comparison of said alpha shape with said convex hull, at least a point of said alpha shape that is shared by said convex hull; and
   generate said simplicial surface model beginning with said at least a point of said alpha shape shared by said convex hull.

20. The system in accordance with claim 19 wherein said processor is configured to:
   identify, based on said comparison of said alpha shape with said convex hull, each facet of said alpha shape that is shared by said convex hull, each of said identified facets having a plurality of edges;
   add each identified facet to said simplicial surface model;
   analyze each edge of said identified facets to determine the number of adjacent facets sharing said edge;
   select, for each of said edges, one adjacent facet to be added to said simplicial surface model; and
   add said selected adjacent facets to said simplicial surface model and discard the other adjacent facets.

21. The system in accordance with claim 20 wherein for each edge of each of said identified facets, said processor is configured to calculate the dihedral angle between said identified facet and each of said adjacent facets and to select said one adjacent facet forming the smallest dihedral angle with said identified facet.

22. The system in accordance with claim 21 wherein said processor is configured to discard each adjacent facet that forms an angle that is greater than a predetermined threshold angle.

23. The system in accordance with claim 20 wherein said processor is configured to analyze each of said facets one at a time.

24. The system in accordance with claim 20 wherein said computer system comprises a queue in which each of said identified facets and each of said selected adjacent facets is stored prior to being analyzed.

25. The system in accordance with claim 24 wherein said processor is configured to
   select a first facet in said queue to be analyzed and to analyze said facet;
   determine, after said first facet has been analyzed, whether additional facets are in said queue; and
   select a second facet in said queue to be analyzed if at least one facet remains in said queue.

26. The system in accordance with claim 19 wherein said processor is configured to:
   identify, based on said comparison of said alpha shape with said convex hull, an edge of said alpha shape that is shared by said convex hull;
   choose a facet of said alpha shape sharing said edge that makes the smallest dihedral angle with one of the facets of said convex hull also sharing said edge; and
   add said chosen facet to said simplicial surface model and discard the other facets of said alpha shape sharing said edge.

27. The system in accordance with claim 19 wherein said processor is configured to:
   identify, based on said comparison of said alpha shape with said convex hull, a point of said alpha shape that is shared by said convex hull;
   choose one of a facet and an edge of said alpha shape sharing said point and making the smallest dihedral angle with one of a facet and an edge of said convex hull also sharing said point; and
   add said chosen one of said facet and said edge to said simplicial surface model and discard the other facets and edges of said alpha shape sharing said point.

28. The system in accordance with claim 19, further comprising a display configured to display said alpha shape, said processor further configured to:
   choose a facet of said alpha shape known to be part of said simplicial surface model that is also visible on said display;
   add said chosen facet to said simplicial surface model;
   analyze each edge of said chosen facet to determine the number of adjacent facets sharing each respective edge;
   select, for each edge, one adjacent facet to be added to said simplicial surface model; and
   add said selected adjacent facets to said simplicial surface model and discard the other adjacent facets.

29. The system in accordance with claim 17 wherein said processor is configured to assign a respective weight to each data point of said plurality of data points, and to compute a weighted three-dimensional alpha shape of said plurality of data points.

30. The system in accordance with claim 17 wherein said anatomic structure is at least a portion of a patient's heart, and said processor is configured to generate a three-dimensional simplicial surface model for a plurality of different timepoints in the cardiac cycle of said heart to thereby create a substantially dynamic three-dimensional simplicial surface model of said heart.

31. A method of generating a three-dimensional simplicial surface model of an anatomic structure from a three-dimensional alpha shape model of said structure, the method comprising
   computing, by a processor of a computer system, a three-dimensional convex hull of said structure;
   comparing, by said processor, said alpha shape with said convex hull;
   identifying, by said processor and based on said comparison of said alpha shape with said convex hull, at least a point of said alpha shape that is shared by said convex hull; and
   generating, by said processor, a three-dimensional simplicial surface model of said structure beginning with said at least one point of said alpha shape shared by said convex hull.

32. The method in accordance with claim 31 wherein said identifying step comprises identifying, by said processor and based on said comparison of said alpha shape with said convex hull, each facet of said alpha shape that is shared by said convex hull, and said generating step comprises
   adding, by said processor, each identified facet to said simplicial surface model;
   analyzing, by said processor, each edge of said identified facets to determine the number of adjacent facets sharing each of said edges;

selecting, by said processor and for each of said edges, one adjacent facet to be added to said simplicial surface model; and adding, by said processor, said selected adjacent facets to said simplicial surface model and discarding, by said processor, the remaining adjacent facets.

33. The method in accordance with claim 32 wherein said analyzing step comprises analyzing, by said processor, each facet one at a time.

34. The method in accordance with claim 32 wherein selecting step comprises the substeps of calculating, by said processor, the dihedral angle between said facet being analyzed and each of said adjacent facets, and choosing, by said processor, said one adjacent facet forming the smallest dihedral angle.

35. The method in accordance with claim 34, further comprising discarding, by said processor, an adjacent facet forming a dihedral angle that is greater than a predetermined threshold angle.

36. The method in accordance with claim 32 further comprising placing, by said processor, each of said identified facets and each of said selected adjacent facets in a queue, and said analyzing step further comprising analyzing, by said processor, each facet in said queue.

37. The method in accordance with claim 36 wherein said analyzing step comprises selecting, by said processor, a first facet in said queue to be analyzed and analyzing, by said processor, said facet; said method further comprising:

determining, by said processor and after said first facet has been analyzed, whether additional facets are in said queue; and if at least one addition facet is in said queue, selecting, by said processor, a second facet in said queue to be analyzed, otherwise, terminating, by said processor, said generating step if no other facets are in said queue.

38. The method in accordance with claim 31 wherein said identifying step comprises identifying, by said processor and based on said comparison of said alpha shape with said convex hull, an edge of said alpha shape that is shared by said convex hull, and said generating step comprises;

choosing, by said processor, a facet of said alpha shape sharing said edge that makes the smallest dihedral angle with one of the facets of said convex hull also sharing said edge; and adding, by said processor, said chosen facet to said simplicial surface model and discarding, by said processor, other facets of said alpha shape sharing said edge.

39. The method in accordance with claim 31 wherein said identifying step comprises identifying, by said processor and based on said comparison of said alpha shape with said convex hull, a point of said alpha shape that is shared by said convex hull, and said generating step comprises choosing, by said processor, one of a facet and an edge of said alpha shape sharing said point and making the smallest dihedral angle with one of a facet and an edge of said convex hull also sharing said point; and adding, by said processor, said chosen one of said facet and said edge to said simplicial surface model and discarding, by said processor, the other facets and edges of said alpha shape sharing said point.

40. The method in accordance with claim 31 wherein said identifying step comprises choosing, by said processor, a facet of said alpha shape known to be part of the simplicial surface that is also visible from a user-specified viewpoint, and said generating step comprises adding, by said processor, said facet to said simplicial surface model;

analyzing, by said processor, each edge of said facet to determine the number of adjacent facets sharing each edge of said facet;

selecting, by said processor and for each edge, one adjacent facet to be added to said simplicial surface model; and adding, by said processor, said selected adjacent facets to said simplicial surface model and discarding, by said processor, the remaining adjacent facets.

41. The method of claim 31, further comprising processing, by said processor, said simplicial surface model to fill-in voids in said simplicial surface model.

42. The method of claim 31 wherein said generating step results in the generation of a three-dimensional simplicial surface model having more than one component, the method further comprising one of the steps of keeping, by said processor, the entire simplicial surface model, retaining, by said processor, only the component having the largest surface area, and stitching, by said processor, said components together.

* * * * *